US012522785B2

(12) United States Patent
Liao

(10) Patent No.: US 12,522,785 B2
(45) Date of Patent: Jan. 13, 2026

(54) CLEANING COMPOSITION AND PREPARATION METHOD OF CLEANING COMPOSITION

(71) Applicant: LU-YUAN-BAO BIO-TECH CO., LTD., Taoyuan (TW)

(72) Inventor: Yin Ken Liao, Taoyuan (TW)

(73) Assignee: LU-YUAN-BAO BIO-TECH CO., LTD., Taoyuan (TW)

( * ) Notice: Subject to any disclaimer, the term of this patent is extended or adjusted under 35 U.S.C. 154(b) by 343 days.

(21) Appl. No.: 18/136,899

(22) Filed: Apr. 20, 2023

(65) Prior Publication Data

US 2023/0340372 A1 Oct. 26, 2023

(30) Foreign Application Priority Data

Apr. 22, 2022 (TW) ................................. 111115469

(51) Int. Cl.

| | |
|---|---|
| ***C11D 3/00*** | (2006.01) |
| ***C11D 1/10*** | (2006.01) |
| ***C11D 3/10*** | (2006.01) |
| ***C11D 3/12*** | (2006.01) |
| ***C11D 3/20*** | (2006.01) |
| ***C11D 3/382*** | (2006.01) |
| ***C11D 3/43*** | (2006.01) |
| ***C11D 11/00*** | (2006.01) |

(52) U.S. Cl.
CPC .................. *C11D 3/43* (2013.01); *C11D 1/10* (2013.01); *C11D 3/0094* (2013.01); *C11D 3/10* (2013.01);

(Continued)

(58) Field of Classification Search
CPC ........... C11D 3/43; C11D 1/10; C11D 3/0094; C11D 3/10; C11D 3/1213; C11D 3/2086; C11D 3/382; C11D 11/0094; C11D 3/48; C11D 2111/46; C11D 3/044; C11D 3/046; C11D 3/2093; C11D 7/06; C11D 7/10; C11D 7/20; C11D 7/266; C11D 17/0013; C11D 9/02; C11D 3/0015; C11D 3/0073; C11D 9/005; C11D 9/007; C11D 9/08; C11D 9/10; C11D 9/12; C11D 9/42; C11D 10/042; C11D 10/045; C11D 1/146;

(Continued)

(56) References Cited

U.S. PATENT DOCUMENTS 11,111,461 B1 * 9/2021 Lupberger ........... C11D 3/2044
2006/0030513 A1 * 2/2006 Binder ................. C11D 3/3773
510/515

(Continued)

FOREIGN PATENT DOCUMENTS

CN 105543000 A * 5/2016 ............... C11D 3/50
CN 108277113 A 7/2018

(Continued)

*Primary Examiner* — Eisa B Elhilo

(57) ABSTRACT

The disclosure provides a cleaning composition, comprising purified water, sodium ionized water, coconut oil, calcium oxide and an alkaline substance. A content of the purified water is greater than 50 wt %. A content of the sodium ionized water is 15 to 25 wt %. A content of the coconut oil is 3 to 7 wt %. A content of the calcium oxide is 0.5 to 2.5 wt %. A content of the alkaline substance is 7 to 13 wt %. The purified water, the sodium ionized water, the coconut oil and the alkaline substance account for less than or equal to 100 wt % of the total weight percentage of the cleaning composition. The disclosure further provides a preparation method of a cleaning composition.

13 Claims, 1 Drawing Sheet

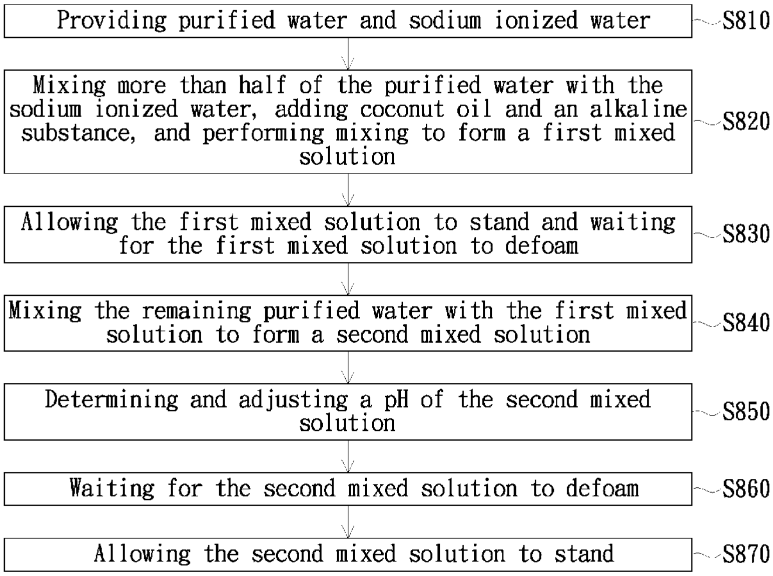

(52) U.S. Cl.
CPC .......... *C11D 3/1213* (2013.01); *C11D 3/2086* (2013.01); *C11D 3/382* (2013.01); *C11D 11/0094* (2013.01)

(58) Field of Classification Search
CPC ... C11D 1/66; A01N 59/06; A01P 1/00; A01P 3/00; A62D 3/36; A62D 2101/04
USPC .................................................. 510/417, 418
See application file for complete search history.

(56) References Cited

U.S. PATENT DOCUMENTS

| | | | | |
|---|---|---|---|---|
| 2007/0122371 A1 | | 5/2007 | Kida et al. | |
| 2007/0123371 A1 | * | 5/2007 | Liberatore | A63B 21/0004 473/457 |
| 2018/0312786 A1 | | 11/2018 | Lu et al. | |

FOREIGN PATENT DOCUMENTS

| | | | | | |
|---|---|---|---|---|---|
| CN | 111218354 A | | 6/2020 | | |
| DE | 102012019981 A1 | * | 4/2014 | ............. | C11D 3/046 |
| KR | 100917337 B1 | * | 9/2009 | ............. | C11D 3/046 |
| KR | 20150014742 A | | 2/2015 | | |
| KR | 20210103222 A | | 8/2021 | | |
| TW | 1704218 B | * | 9/2020 | ............... | C11D 1/83 |
| TW | 742838 B | | 10/2021 | | |
| TW | 1742838 B | * | 10/2021 | ............... | C11D 3/48 |
| WO | 2010062080 A2 | | 6/2010 | | |
| WO | 2019180738 A1 | | 9/2019 | | |

* cited by examiner

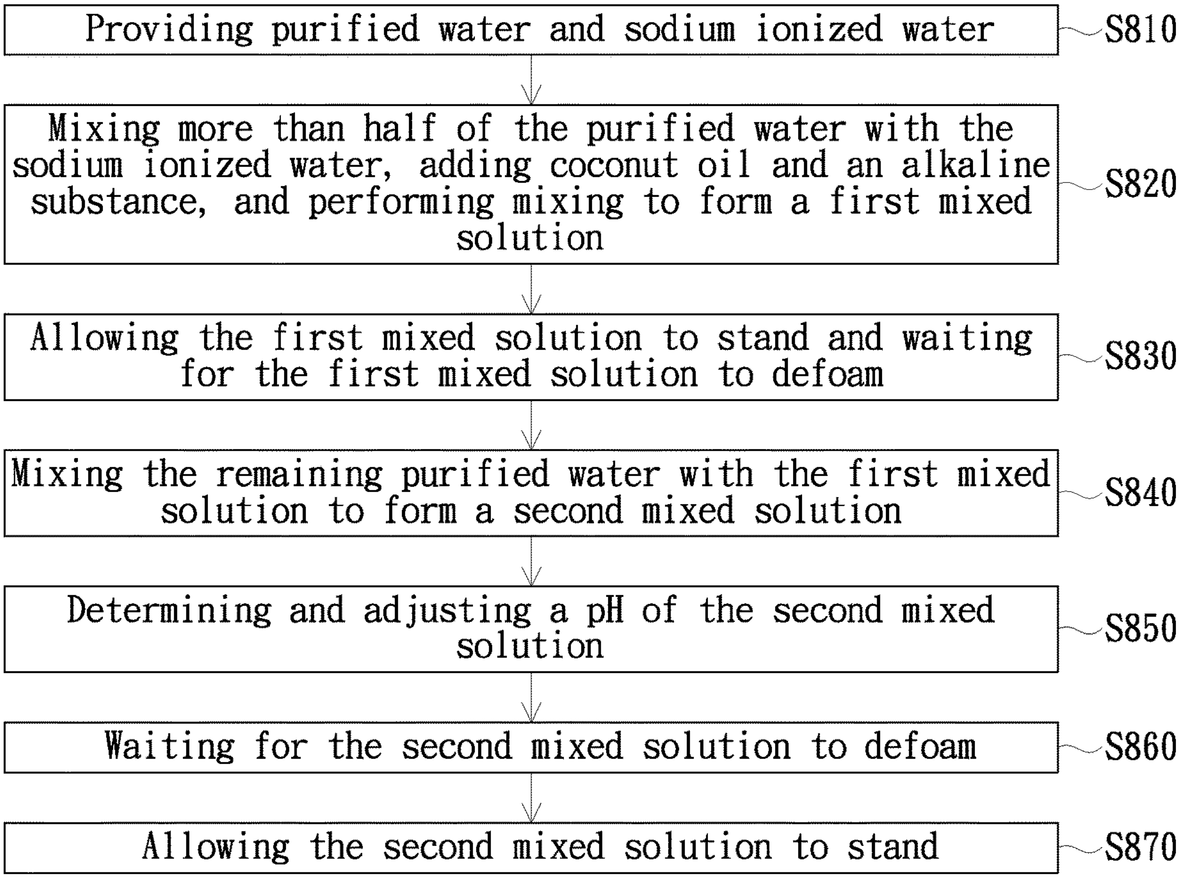
Providing purified water and sodium ionized water
S810
Mixing more than half of the purified water with the sodium ionized water, adding coconut oil and an alkaline substance, and performing mixing to form a first mixed solution
S820
Allowing the first mixed solution to stand and waiting for the first mixed solution to defoam
S830
Mixing the remaining purified water with the first mixed solution to form a second mixed solution
S840
Determining and adjusting a pH of the second mixed solution
S850
Waiting for the second mixed solution to defoam
S860
Allowing the second mixed solution to stand
S870

CLEANING COMPOSITION AND PREPARATION METHOD OF CLEANING COMPOSITION

FIELD OF THE INVENTION

The disclosure relates to a cleaning composition, in particular to a cleaning composition prepared by a cold process.

BACKGROUND OF THE INVENTION

With the development of petrochemical industry, people can quickly obtain a large number and variety of daily necessities, such as detergents, at a cheap price. In order to achieve the required functions and reduce the preparation cost, cleaning products are often prepared using synthetic chemicals to meet the needs of manufacturers and consumers. Cleaning products are discharged from households, factories and businesses after use. Although they are treated before being released into the natural environment, the unnatural ingredients in them still cause pollution to the environment.

SUMMARY OF THE INVENTION

The disclosure provides a cleaning composition. The cleaning composition of the disclosure is prepared from relatively natural active ingredients by a cold process, and has multiple functions, and is suitable for cleaning various articles and environmentally friendly.

The cleaning composition provided by the disclosure comprises purified water, sodium ionized water, coconut oil, calcium oxide and an alkaline substance. A content of the purified water is greater than 50 wt %. A content of the sodium ionized water is 15 to 25 wt %. A content of the coconut oil is 3 to 7 wt %. A content of the calcium oxide is 0.5 to 2.5 wt %. A content of the alkaline substance is 7 to 13 wt %. The purified water, the sodium ionized water, the coconut oil and the alkaline substance account for less than or equal to 100 wt % of the total weight percentage of the cleaning composition.

In an example of the disclosure, the purified water has small clusters of water molecules, and has a nuclear magnetic resonance full width at half maximum of less than 50 Hz.

In an example of the disclosure, the sodium ionized water is formed by electrolyzing an aqueous solution of sodium chloride twice.

In an example of the disclosure, the alkaline substance includes sodium bicarbonate and sodium percarbonate; and a content of the sodium bicarbonate is 5 to 9 wt %, and a content of the sodium percarbonate is less than the content of the sodium bicarbonate.

In an example of the disclosure, the calcium oxide is calcium oxide powder, and the calcium oxide powder comprises nanoparticles.

In an example of the disclosure, the cleaning composition further comprises a foaming agent, a surfactant or a combination thereof; and a content of the foaming agent and the surfactant is 5 to 9 wt %.

In an example of the disclosure, the foaming agent and the surfactant are selected from the group consisting of coconut powder and sodium lauroyl sarcosinate.

In an example of the disclosure, a content of the coconut powder is further 3 to 7 wt %, and a content of the sodium lauroyl sarcosinate is less than the content of the coconut powder.

In an example of the disclosure, the cleaning composition further comprises citric acid and an essential oil; and a content of the citric acid is less than 1 wt %, and a content of the essential oil is less than 1 wt %.

The disclosure further provides a manufacturing method of a cleaning composition, including: providing purified water and sodium ionized water; mixing more than half of the purified water with the sodium ionized water, adding coconut oil and an alkaline substance, and performing mixing to form a first mixed solution; allowing the first mixed solution to stand and waiting for the first mixed solution to defoam; mixing the remaining purified water with the first mixed solution to form a second mixed solution; determining and adjusting a pH of the second mixed solution; waiting for the second mixed solution to defoam; and allowing the second mixed solution to stand.

Due to the use of the purified water, the cleaning composition is more effective, and is safer and more environmentally friendly in use.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The FIGURE is a schematic flowchart of a preparation method of a cleaning composition according to an example of the disclosure.

DETAILED DESCRIPTION OF PREFERRED EMBODIMENTS

The disclosure provides a cleaning composition, comprising: purified water, sodium ionized water, coconut oil, calcium oxide and an alkaline substance. A content of the purified water is greater than 50 wt %, a content of the sodium ionized water is 15 to 25 wt %, a content of the coconut oil is 3 to 7 wt %, a content of the calcium oxide is 0.5 to 2.5 wt %, and a content of the alkaline substance is 7 to 13 wt %. In other words, the cleaning composition of the disclosure is prepared from greater than 50 wt % of the purified water, 15 to 25 wt % of the sodium ionized water, 3 to 7 wt % of the coconut oil, 0.5 to 2.5 wt % of the calcium oxide and 7 to 13 wt % of the alkaline substance. The purified water, the sodium ionized water, the coconut oil and the alkaline substance account for less than or equal to 100 wt % of the total weight percentage of the cleaning composition.

The purified water of the disclosure can be obtained by performing a water quality optimization process on ordinary water. The ordinary water can be, for example, tap water, underground water, well water, stream water, river water, spring water and rainwater. The water quality optimization process includes refinement of clusters of water molecules. The cluster of water molecules is a cluster of a plurality of water molecules bonded by hydrogen bonds. Sizes of clusters of water molecules from different water sources vary, i.e., the number of water molecules in the clusters varies. The size of cluster of water molecules is generally measured by an NMR FWHM frequency method. The purified water of the example of the disclosure comprises smaller clusters of water molecules. In some embodiments, for example, the clusters of water molecules of the purified water have a nuclear magnetic resonance (NMR) full width at half maximum (FWHM) of less than 50 Hz, for example, 48 Hz.

The refinement of clusters of water molecules can be achieved by any physical or chemical method, for example, multiple (repeated) impact, frequency oscillation, frequency resonance, and/or the use of catalysts. The multiple (repeated) impact can be performed by, for example, a screw compressing process, and the frequency oscillation and the frequency resonance can be performed by, for example, an energy rod. The energy rod can be a micro conductive stainless steel bar filled with energy water. The refinement of the clusters of water molecules can be achieved by one or a combination of the methods above. Besides, when the refinement of the clusters of water molecules is performed by the energy rod, a Jinjing water softening rod, for example, can be used. When the refinement of the clusters of water molecules is performed by the catalyst, Biocell Water System can be adapted. The disclosure does not limit the method and apparatus for refining the clusters of water molecules. Any method and apparatus that can obtain the purified water having an NMR FWHM of less than 50 Hz after refining the clusters of water molecules is applicable to the disclosure. The refined clusters of water molecules can be kept for a long time, and in general, will not return to large clusters due to time, temperature and other environmental changes.

In some examples of the disclosure, the water quality optimization process further includes, for example, but not limited to, precipitation, centrifugation, filtration, ultrafiltration, reverse osmosis, softening, deionization or a combination thereof performed on water. The precipitation, centrifugation, filtration, ultrafiltration, reverse osmosis, softening and deionization can be completed by any conventional method or apparatus, which will not be described in detail here. The refinement of the clusters of water molecules can be performed after the steps of precipitation, centrifugation, filtration, ultrafiltration, reverse osmosis, softening and/or deionization. Preferably, these steps help in the refinement of clusters of water molecules.

The sodium ionized water of the disclosure is obtained by electrolyzing an aqueous solution of sodium chloride. In some embodiments, the aqueous solution of sodium chloride preferably has a concentration of 5%. The electrolysis is preferably performed twice. The sodium ionized water can be obtained from a preparation process and/or a preparation device of hypochlorous acid-containing electrolyzed water. For example, the preparation device of hypochlorous acid-containing electrolyzed water is such as a hypochlorous acid-containing electrolyzed water generator of ENVIROLYTE, or an apparatus of Ecas4 Anolyte, which can generate alkaline electrolyzed water after electrolyzing the aqueous solution of sodium chloride. The alkaline electrolyzed water can be provided or used as sodium ionized water. Specifically, the sodium ionized water can be an alkaline aqueous solution containing sodium chloride, and a concentration of the sodium chloride is, for example, less than 1 wt %. In some examples of the disclosure, the sodium ionized water contains sodium chloride and sodium hydroxide. A concentration of the sodium chloride is, for example, 0.5 wt %, and a concentration of the sodium hydroxide is, for example, less than 0.1%. A pH of the sodium ionized water is, for example, 12.0±0.5. The sodium ionized water has an emulsifying function in the process of preparing the cleaning composition, and can replace or promote the use of a synthetic emulsifier. The coconut oil used in the disclosure is a natural vegetable oil, which undergoes saponification reaction with the alkaline substance. In addition, other natural vegetable oils, such as olive oil, palm kernel oil, palm oil, red palm oil, avocado oil, almond oil, castor oil, rice bran oil, wheat germ oil, sesame oil, sunflower oil, canola oil, Kukui nut oil, macadamia oil, hazelnut oil, apricot kernel oil, camellia oil, evening primrose oil and rose hip oil, jojoba oil, shea butter, beeswax, cocoa butter, white oil and grape seed oil can also be used instead of or in combination with the coconut oil. The alkaline substance can be any substance that can undergo saponification reaction with coconut oil, for example, sodium hydroxide, potassium hydroxide, sodium carbonate and potassium carbonate. In some examples of the disclosure, the alkaline substance used includes sodium bicarbonate and sodium percarbonate. A content of the sodium bicarbonate is preferably 5 to 9 wt %, and a content of the sodium percarbonate is preferably less than the content of the sodium bicarbonate, for example, 2 wt %. The sodium bicarbonate and the sodium percarbonate also have functions of odor removal, scale removal, rust removal and bleaching, so that the cleaning composition of the disclosure is suitable for cleaning various articles such as clothes and utensils. In some examples of the disclosure, the alkaline substance can further include sodium silicate. A content of the sodium silicate is preferably less than the content of the sodium percarbonate, for example, 1 wt %. The sodium silicate has a characteristic of adsorbing heavy metals such as lead, copper, cadmium and chromium, and can bind to the heavy metals to form a precipitate.

The calcium oxide has functions of sterilization and pesticide degradation. The calcium oxide of the disclosure is in the form of powder. The powder includes fine particles, preferably nanoparticles. In some examples of the disclosure, the cleaning composition can further include a foaming agent and a surfactant. A content of the foaming agent and the surfactant can be, for example, 5 to 9 wt %, and the foaming agent and the surfactant are preferably relatively natural substances. In some examples of the disclosure, the cleaning composition comprises, for example, 3 to 7 wt % of coconut powder. The coconut powder is a natural foaming agent, and can also be used as the surfactant. The coconut powder can make the foam produced by the cleaning composition dense and fine, and make the cleaning composition mild in use and easy to rinse. In other examples of the disclosure, sodium lauryl sulfate or other natural foaming agents can also be used instead of or in combination with the coconut powder. In some examples of the disclosure, sodium lauroyl sarcosinate can further be comprised. The sodium lauroyl sarcosinate can also be used as the surfactant, and a content of the sodium lauroyl sarcosinate is preferably less than the content of the coconut powder, for example, 1 wt %. The sodium lauroyl sarcosinate also has a thickening effect, and can improve the softness and glossiness of clothes. In other examples of the disclosure, other anionic surfactants can also be used instead of or in combination with the sodium lauroyl sarcosinate. The cleaning composition can further comprise citric acid. A content of the citric acid is preferably less than 1 wt %. The citric acid can be used to adjust the pH, and has the functions of scale removal and rust removal, and makes the surface of articles easy to clean.

In a preferred example of the disclosure, the cleaning composition is prepared from 55 wt % of purified water, 20 wt % of sodium ionized water, 5 wt % of coconut oil, 2 wt % of calcium oxide, 7 wt % of sodium bicarbonate, 2 wt % of sodium percarbonate, 1 wt % of sodium silicate, 2 wt % of calcium oxide powder, 5 wt % of coconut powder, 2 wt % of sodium lauroyl sarcosinate, 0.5 wt % of citric acid and 0.5 wt % of lemon essential oil. The cleaning composition has functions of bacteriostasis/fungistasis, oil removal, scale removal, rust removal, bleaching, heavy metal removal and odor removal, and can be used on many materials, such as organic matter, wool, plastics, metals, wood, glass, stone and the like. The cleaning composition can be used for cleaning clothes, utensils, vegetables and fruits, daily necessities, kitchen equipment, furniture, home decorations, pets, skin and hair directly or after dilution. In addition, the cleaning composition can be diluted and sprayed to clean the air and remove odor.

The disclosure further provides a preparation method of a cleaning composition. The preparation method can be used for preparing the aforementioned cleaning composition. Preferably, the aforementioned cleaning composition is prepared by the preparation method described below.

The preparation method provided by the disclosure includes the following steps: S810: providing purified water and sodium ionized water; S820: mixing more than half of the purified water with the sodium ionized water, adding coconut oil and an alkaline substance, and performing mixing to form a first mixed solution; S830: allowing the first mixed solution to stand and waiting for the first mixed solution to defoam; S840: mixing the remaining purified water with the first mixed solution to form a second mixed solution; S850: determining and adjusting a pH of the second mixed solution; S860: waiting for the second mixed solution to defoam; and S870: allowing the second mixed solution to stand. For the amounts of the ingredients added in the steps, reference can be made to the description above.

In step S810, the provision of the purified water can include a water quality optimization process. The water quality optimization is as described above and will not be repeated here. The provision of the sodium ionized water can include preparation of the aqueous solution of sodium chloride and electrolysis of the aqueous solution of sodium chloride. The purified water used in step S820 can be, for example, the purified water having the normal temperature and accounting for 30 wt % of the total weight of the cleaning composition. First, the purified water and the sodium ionized water are mixed by using a machine. Next, preferably, when the mixture is mixed sufficiently, the coconut oil and the alkaline substance are added under continuous stirring with the machine, and then, the mixture is further stirred to form the first mixed solution. In some examples of the disclosure, the alkaline substance includes sodium bicarbonate, sodium percarbonate and sodium silicate. During the mixing and stirring, saponification reaction occurs and foam is produced. The stirring in step S820 should last for a period of time, for example, tens of minutes to several hours, such as about two hours. Except for the purified water, the other ingredients such as the sodium ionized water can be added in full amounts according to their contents. The contents of these ingredients are as described above and will not be repeated here.

The step of forming the first mixed solution can further include adding calcium oxide powder, the foaming agent and the surfactant, or a combination thereof. In some examples of the disclosure, the foaming agent and the surfactant include coconut powder, sodium lauryl sulfate, sodium lauroyl sarcosinate or a combination thereof. In step S830, the time for waiting for the first mixed solution to defoam can be, for example, several hours to one day depending on the ambient temperature, liquid quantity and other conditions. For example, for 3 tons of liquid, in step S830, the time required is about 6 hours in summer and 12 hours in winter, and for 5 tons of liquid, the time required can be twice as long as the time required for 3 tons of liquid. The purified water used in step S840 can be, for example, the remaining 25 wt %. Besides, the step of forming the second mixed solution can further include adding citric acid. The citric acid generally functions to reduce the pH, and can be used to adjust the pH in step S850, for example, can adjust the pH to 10 to 10.5 in step S850. The lemon essential oil can also be added during the formation of the second mixed solution.

In step S860, the time for waiting for the second mixed solution to defoam can be shorter than the time required in step S830. Steps S820 to S860 can be performed in, for example, a stirring tank. Basically, the second mixed solution can be used for cleaning after defoaming. The second mixed solution can be allowed to stand in the stirring tank in step S870, or transferred to a storage container and allowed to stand in the storage container after step S860. The standing in step S870 helps the ingredients react continuously and reach a stable state, thereby completing the preparation of the cleaning composition. Steps S820 to S870 can be performed at a room temperature, for example, from more than ten degrees Celsius to less than forty degrees Celsius, preferably at about 30° C. If the room temperature is low, a temperature of the reaction solution can be increased to about 30° C. The cleaning composition of the disclosure and/or the cleaning composition prepared by the method is generally a transparent liquid or a transparent thick liquid in appearance, but not limited thereto, and can also be, for example, milk-white or jelly-like depending on the ambient temperature.

The cleaning composition of the disclosure is prepared from multiple active ingredients, and thus, has the functions of bacteriostasis/fungistasis, scale and stain removal, dust removal, heavy metal removal, odor removal, etc. Moreover, the cleaning composition is mild and skin-friendly. In addition, the ingredients used in the cleaning composition of the disclosure are relatively natural, and the natural ingredients account for more than 50 wt %. Moreover, the preparation process is relatively simple, so less synthetic chemicals are used, which is environmentally friendly. Besides, the purified water used as the main ingredient can effectively exert the functions of the aforementioned ingredients due to its high energy, and is safe to clean organisms and food.

The cleaning composition of the disclosure was tested for its biodegradability, bacteriostasis/fungistasis and pesticide removal rate. The results are as follows:

(1) The biodegradability tested by methods of CNS 4984, CNS 4985 and CNS 4986 of National Standards of the Republic of China was up to more than 97%, which satisfies the Taiwan Green Mark Standard or other similar standards such as ISO standards.

(2) By SGS testing, the bacteriostasis/fungistasis rate for bacteria and fungi such as *Escherichia coli* was up to 99.9%, and the acting time could reach 24 hours. The details are as follows.

TABLE 1

Bacteriostasis/fungistasis test results

| Strain Name | Original inoculum size (CFU/mL) | Acting time | Bacterial/fungal count after treated with a sample (CFU/mL) | Bacteriostasis/ fungistasis rate R (%) |
|---|---|---|---|---|
| *Escherichia coli* | $8.25*10^5$ | 30 min | <1 | 99.9% |
| | | 24 h | <1 | |
| *Staphylococcus aureus* subsp. *aureus* | $6.00*10^5$ | 30 min | <1 | 99.9% |
| | | 24 h | <1 | |

TABLE 1-continued

| Bacteriostasis/fungistasis test results | | | | |
|---|---|---|---|---|
| Strain Name | Original inoculum size (CFU/mL) | Acting time | Bacterial/fungal count after treated with a sample (CFU/mL) | Bacteriostasis/ fungistasis rate R (%) |
| *Pseudomonas aeruginosa* | 4.50*$10^5$ | 30 min | <1 | 99.9% |
| | | 24 h | <1 | |
| *Candida albicans* | 3.10*$10^5$ | 30 min | <1 | 99.9% |
| | | 24 h | <1 | |
| *Aspergillus brasiliensis* | 3.10*$10^5$ | 30 min | <1 | 99.9% |
| | | 24 h | <1 | |
| *Penicillium funiculosum* | 3.55*$10^5$ | 30 min | <1 | 99.9% |
| | | 24 h | <1 | |

Note:
SGS report number: UG/2015/50206

(3) The removal rates for commercially available pesticides imidacloprid, pyraclostrobin and thiamethoxam were tested to be more than eighty percent. The removal rate for thiamethoxam was up to 99.21%. The removal rates for acetamiprid, carbendazim, chlorantraniliprole and chlorfluazuron were more than fifty percent. The removal rate for carbendazim was nearly seventy percent. The removal rates for methomyl and kresoxim-methyl were more than forty percent. The removal rate for metalaxyl was nearly thirty percent. The test method was "Method of Test for Pesticide Residues in Foods-Multiresidue Analysis (4)" in No. 1011902441 Announcement of revision issued by the Ministry of Health and Welfare of the Republic of China on Jul. 17, 2012.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cleaning composition, comprising:

purified water, a content of the purified water being greater than 50 wt %; wherein the purified water has small clusters of water molecules, and has a nuclear magnetic resonance full width at half maximum of less than 50 Hz;

sodium ionized water generated by electrolyzing an aqueous solution of sodium chloride, and a content of the sodium ionized water being 15 to 25 wt %;

coconut oil, a content of the coconut oil being 3 to 7 wt %;

calcium oxide, a content of the calcium oxide being 0.5 to 2.5 wt %; and an alkaline substance, a content of the alkaline substance being 7 to 13 wt %;

wherein the purified water, the sodium ionized water, the coconut oil and the alkaline substance account for less than or equal to 100 wt % of the total weight percentage of the cleaning composition.

2. The cleaning composition according to claim 1, wherein the sodium ionized water is further formed by electrolyzing the aqueous solution of sodium chloride twice.

3. The cleaning composition according to claim 1, wherein the alkaline substance includes sodium bicarbonate and sodium percarbonate; and a content of the sodium bicarbonate is 5 to 9 wt %, and a content of the sodium percarbonate is less than the content of the sodium bicarbonate.

4. The cleaning composition according to claim 1, wherein the calcium oxide is calcium oxide powder, and the calcium oxide powder comprises nanoparticles.

5. The cleaning composition according to claim 1, further comprising a foaming agent, a surfactant or a combination thereof, wherein a content of the foaming agent and the surfactant is 5 to 9 wt %.

6. The cleaning composition according to claim 5, wherein the foaming agent and the surfactant are selected from the group consisting of coconut powder and sodium lauroyl sarcosinate.

7. The cleaning composition according to claim 6, wherein a content of the coconut powder is further 3 to 7 wt %, and a content of the sodium lauroyl sarcosinate is less than the content of the coconut powder.

8. The cleaning composition according to claim 1, further comprising citric acid and an essential oil, wherein a content of the citric acid is less than 1 wt %, and a content of the essential oil is less than 1 wt %.

9. A preparation method of a cleaning composition, including:

providing purified water; wherein the purified water has small clusters of water molecules, and has a nuclear magnetic resonance full width at half maximum of less than 50 Hz;

providing sodium ionized water, comprising:

preparing aqueous solution of sodium chloride; and electrolyzing the aqueous solution of sodium chloride;

mixing more than half of the purified water with the sodium ionized water, adding coconut oil and an alkaline substance, and performing mixing to form a first mixed solution;

allowing the first mixed solution to stand and waiting for the first mixed solution to defoam;

mixing the remaining purified water with the first mixed solution to form a second mixed solution;

determining and adjusting a pH of the second mixed solution;

waiting for the second mixed solution to defoam; and allowing the second mixed solution to stand.

10. The preparation method of the cleaning composition according to claim 9, wherein a content of the purified water is greater than 50 wt %, a content of the sodium ionized water is 15 to 25 wt %, a content of the coconut oil is 3 to 7 wt %, and a content of the alkaline substance is 7 to 13 wt %.

11. The preparation method of the cleaning composition according to claim 9, wherein the step of forming the first mixed solution further comprises adding 0.5 to 2.5 wt % of calcium oxide.

12. The preparation method of the cleaning composition according to claim 9, wherein the step of forming the first mixed solution further comprises adding a foaming agent and a surfactant and performing mixing, a content of the foaming agent and the surfactant being 5 to 9 wt %.

13. The preparation method of the cleaning composition according to claim 9, wherein the step of forming the second mixed solution further comprises adding citric acid, a content of the citric acid being less than 1 wt %.

* * * * *